United States Patent Office 3,419,130
Patented Dec. 31, 1968

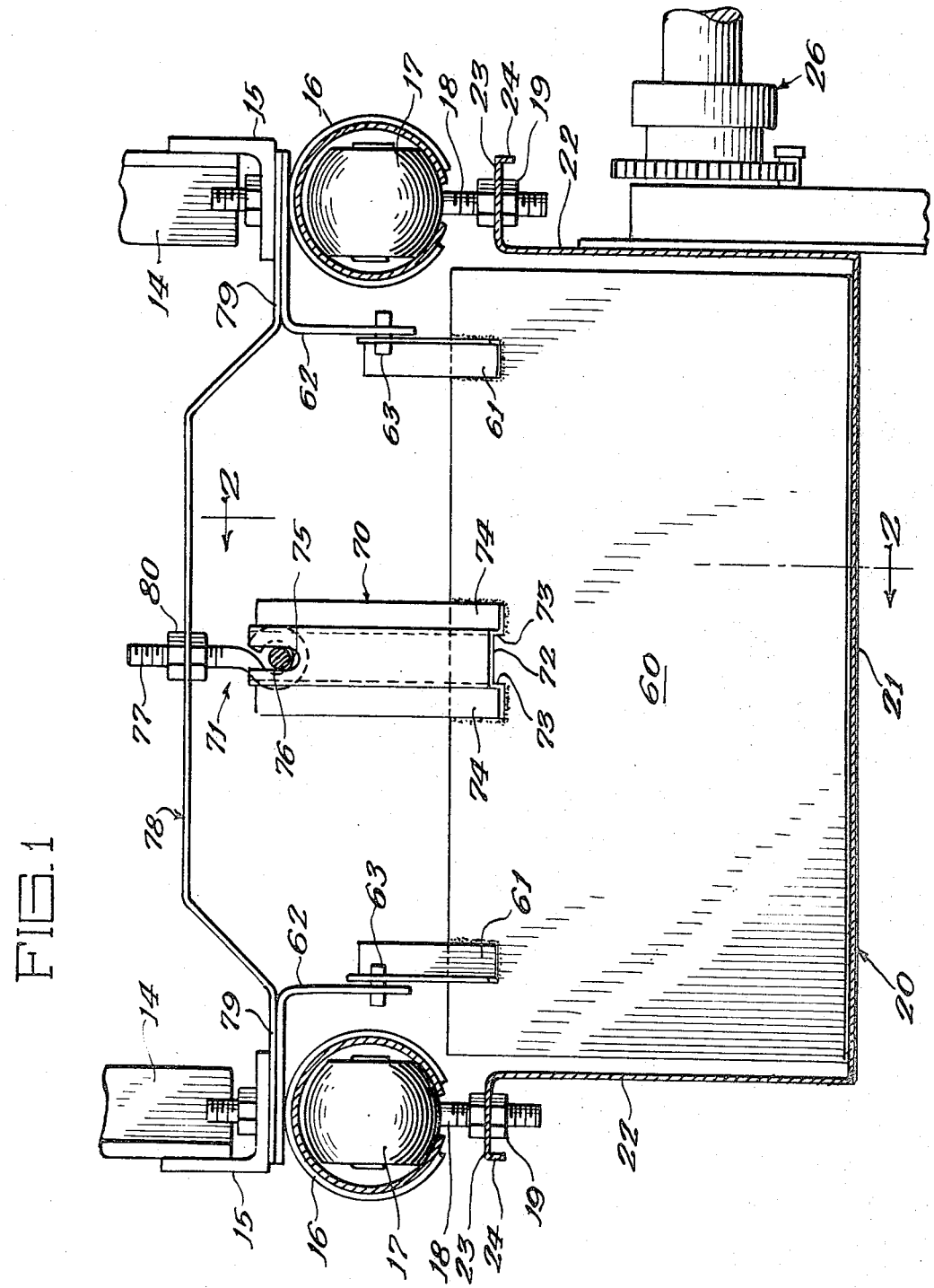

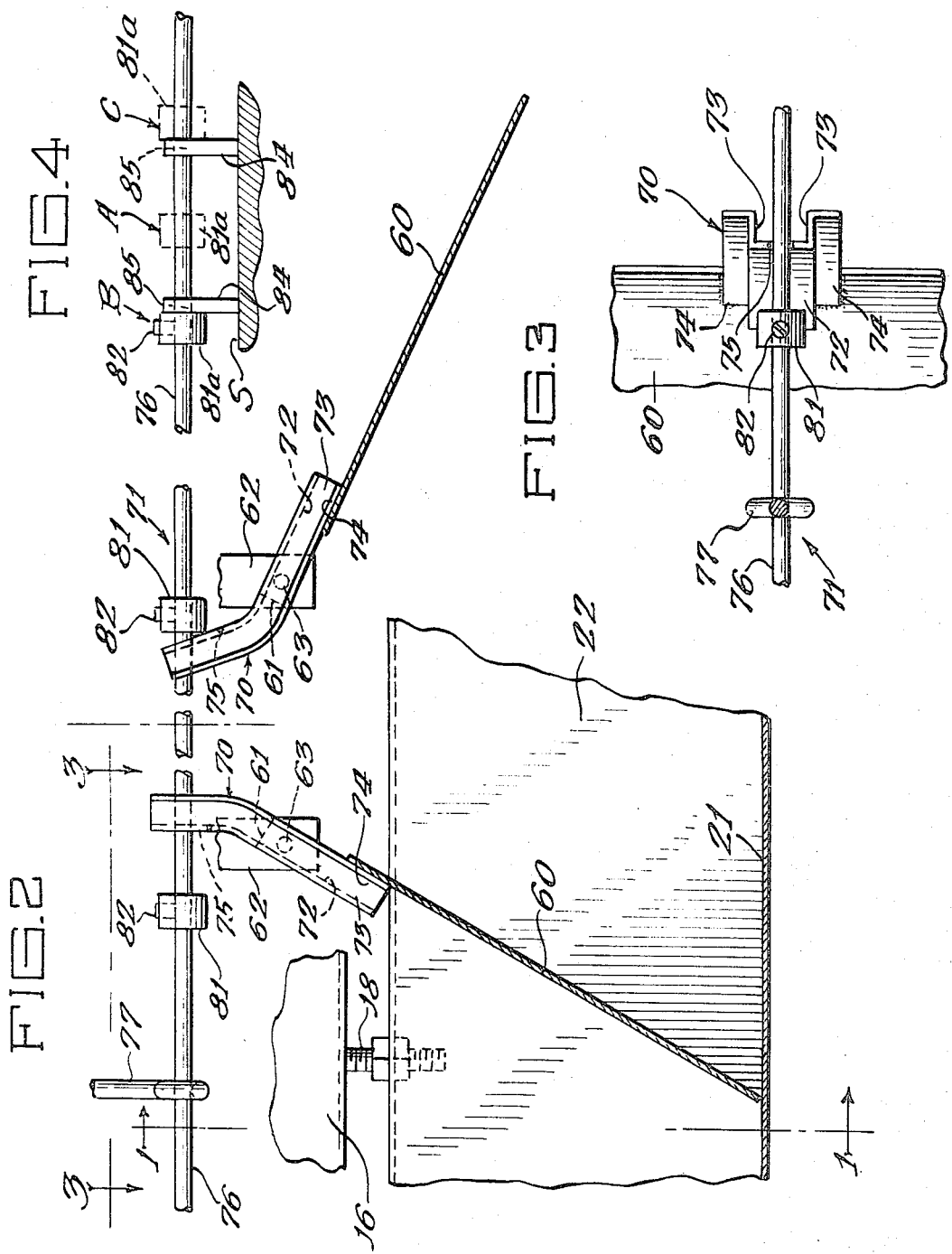

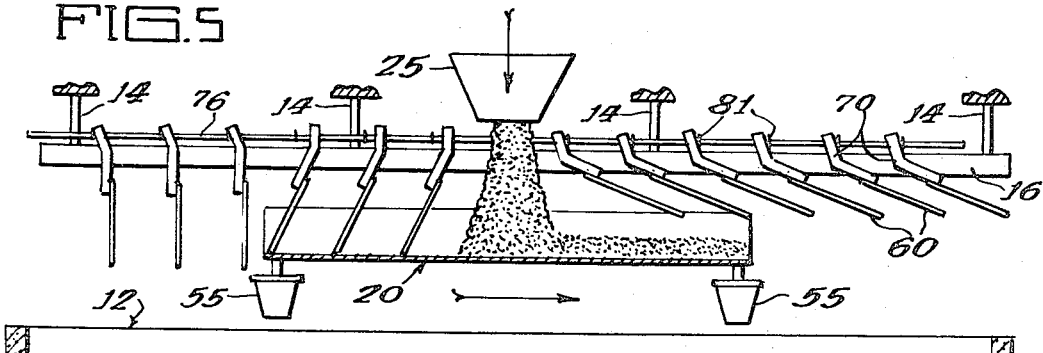
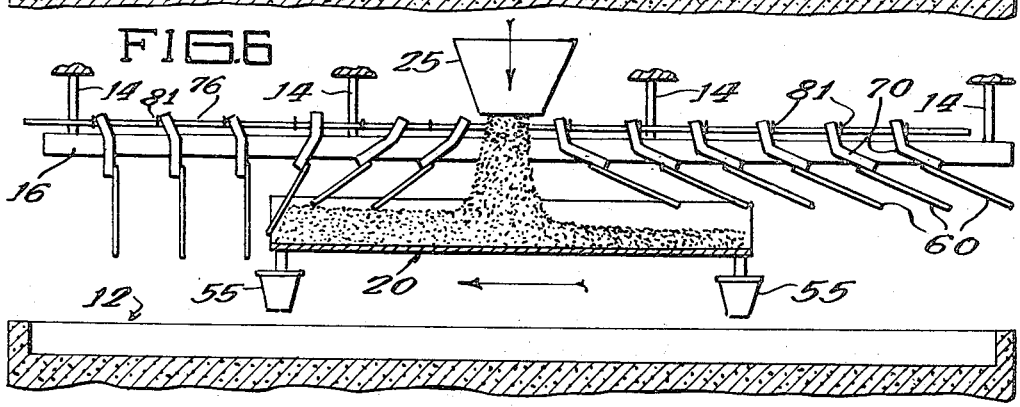
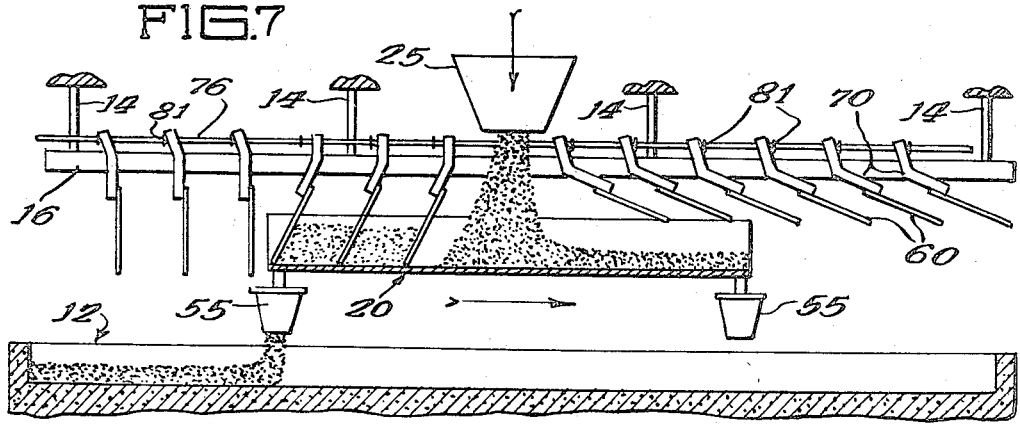
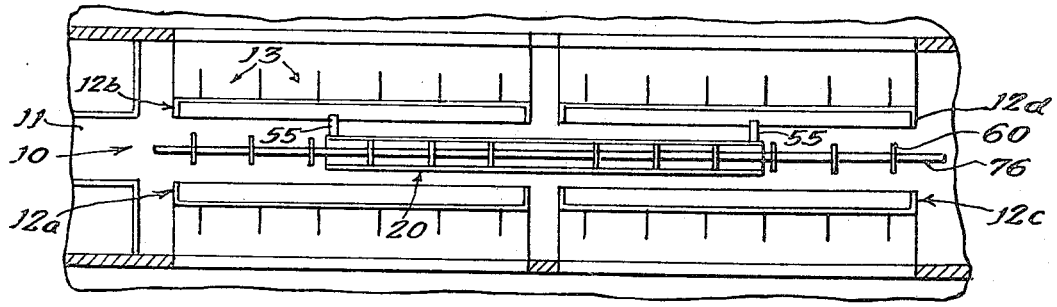

3,419,130
SHUTTLE TYPE ANIMAL FEEDER
Robert G. Ferris, Harvard, Ill., assignor to Starline, Inc., a corporation of Illinois
Filed June 6, 1967, Ser. No. 643,982
6 Claims. (Cl. 198—67)

ABSTRACT OF THE DISCLOSURE

A shuttle type animal feeding apparatus including a trough that receives material thereon at a central supply station, and which is reciprocable back and forth over an animal feeding station and beneath first and second sets of pivoted sweep member at opposite sides of the supply station which discharge material from opposite ends of the trough to the feeding station. Control means is provided for selectively disabling each of the sets of sweep members, so that the amount of feed being discharged from each end of the trough can be varied and controlled.

Cross reference to related application

The present application is an improvement upon the shuttle type animal feeder disclosed in Ferris et al. application Ser. No. 592,044, filed Nov. 4, 1966, and assigned to the assignee of the present application.

Background of the invention

This invention relates in general to shuttle type conveyors, and more particularly to shuttle type conveying and dispensing means for distributing animal feed to a plurality of animal feeding stations.

In a known type of shuttle conveyor, chains are trained around a movable table at opposite sides thereof, with the chains being fixed to a support for the table. Sprockets and a drive motor therefor are carried by a movable table, with each sprocket drivingly engaging a chain. Thus, when the motor is energized, the table will move because of the reaction force of the sprockets against the chains. A material supply source is provided centrally above the movable table, and dispensing members that extend across the table are connected between the chains, so that as the table moves, the dispensing members may scrape material off an end of the table. Reversing means are provided for the motor so that the direction of movement of the table can be changed, whereupon material discharge will take place from the opposite end of the table. The above mentioned shuttle type of conveyor is typified by that disclosed in Fischer Patent 2,873,037, and while this structure has in general functioned satisfactorily, it does possess many inherent disadvantages. For example, there is a great deal of frictional resistance to relative movement between the chains and the table, which results in high power consumption, and wearing at the interengaging surfaces of the movable parts. Additionally, the drive system is somewhat complicated, in that it is necessary that the motor means travel with the table, and that reversing means be provided for the motor to change the direction of table movement.

In another known type of conveying device, a plurality of sweeps or baffles are pivotally mounted a distance less than their length above a reciprocating plate, so that when the plate is moved in one direction, the material being conveyed on the plate will freely pass under the baffles; while when the plate is moved in an opposite direction, the baffles will serve to push the material along the plate. Such conveyors have functioned satisfactorily to conveyor material longitudinally of a feed trough, and typical prior art arrangements are shown in Cordis Patent 2,785,791 and Reed Patent 3,024,765. Peterson Patent 2,964,126 discloses a similar type of conveyor wherein hinged scraper blades are carried by a reciprocating member that is movable relative to a stationary trough for discharging material from outlets at opposite ends of the trough. While the latter type of conveyors have functioned satisfactorily for their intended purposes, they lack the inherent advantage of a shuttle type conveyor wherein a central material source can be utilized to convey material to a movable table, which can then discharge material from the ends of the table at discharge points on opposite sides of the material source.

The shuttle type conveying and feeding apparatus that is disclosed in the above mentioned Ferris et al application retains the advantages of the structures described above, while obviating the disadvantages and problems inherent therein. The shuttle type apparatus of the Ferris et al. application includes a longitudinally movable trough that is positioned to reciprocate beneath a central material supply station, with a plurality of pivotally mounted sweeps or baffles being provided at opposite sides of the material supply station in operative association with the trough for discharging material from opposite ends thereof at the animal feeding stations. While the apparatus disclosed in the Ferris et al. application has functioned satisfactorily and fully achieved each of its intended objects, with such apparatus it has not been possible to vary and control the amount of feed that is distributed to a particular feed bunk; and additionally, it has not been possible to discontinue the distribution of a ration of feed into the feed bunk on an opposite side of the material supply station.

Summary of the invention

The apparatus disclosed in the present application represents an improvement upon the apparatus disclosed in the Ferris et al. application, and the improvement of the present invention comprises novel control means for selectively disabling one or the other of the sets of sweep members to either completely discontinue the distributing of feed at one side of the material supply station, or to vary and control the amount of feed that is distributed into the animal feeding stations by selective manipulation of the control means.

Brief description of the drawings

FIG. 1 is a transverse cross sectional view through an intermediate portion of a preferred embodiment of the feeding apparatus of the present invention;

FIG. 2 is a fragmentary cross sectional view taken generally along line 2—2 of FIG. 1;

FIG. 3 is a cross sectional view taken generally along line 3—3 of FIG. 2;

FIG. 4 is a fragmentary detail view of an illustrative selector means for controlling movement of the control rod of the present invention;

FIGS. 5–7 are schematic side elevational views showing the apparatus of the present invention moving in opposite directions to receive, convey and discharge material; and FIG. 8 is a schematic plan view illustrating the use of the present invention in servicing four feed mangers.

Description of the preferred embodiment

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated. The scope of the invention will be pointed out in the appended claims.

The feed distributing device of the present invention is shown generally at 10, and in view of the similarity between the structure disclosed in the present application and that of the above mentioned Ferris et al. application similar reference characters have been employed to designate corresponding elements so as to facilitate cross referencing between the two applications.

Feed distributing device 10 is suspended from a pair of spaced rows of channel shaped hanger members 14 that are secured to suitable support structure, not shown. L-shaped brackets 15 are secured adjacent the lower end of each hanger member 14 in alignment with one another, with a downwardly open split tubular track member 16 secured to each row of aligned brackets 15. A plurality of carriage assemblies 17 are mounted for longitudinal movement within each track 16, and support bolts 18 extend downwardly from each carriage 17.

A trough or pan 20 is secured to bolts 18 by nuts 19, and as best seen in FIG. 1, trough 20 is an open ended, generally U-shaped member that includes a bottom wall 21, upwardly extending vertically disposed side walls 22, outwardly extending horizontally disposed flanges 23 at the upper ends of side walls 22, and downwardly extending flanges 24 at the outer ends of flanges 23. Bolts 18 impale openings in trough flanges 23, and nuts 19 bear against opposite sides of the flanges 23, so that the trough 20 can be positively secured at vertically adjusted positions relative to the support structure.

Trough 20 is slightly longer than one-half the length of manger 12 (FIGS. 5-7), and drive means 26, which may take the form of that shown in detail in Ferris et al. application Ser. No. 592,049, is provided for reciprocating trough 20 back and forth beneath a material supply source in the form of a hopper 25 which is positioned generally midway between the ends of the tracks 16 on support means (not shown) and which is adapted to receive material from a silo unloader, conveyor or the like. The material input from hopper 25 to trough 20 is continuous and preferably at a constant rate.

Identical feed distributing means is provided at each end of the trough 20, and each said means includes a rotatably mounted discharge chute 55 which may be rotated from the full line position to the broken line position of FIG. 8 to selectively discharge into one or the other of feed mangers 12a or 12b.

Means is provided for discharging material from the ends of trough 20, and said discharge means includes a plurality of baffle-like sweep members 60 that are spaced substantially equally along guide tracks 16. Arms 61 are fixed to opposite sides of sweeps 60 and extend upwardly so as to be pivotally secured to L-shaped brackets 62 by pivot pins 63. As is clear from FIG. 2, the distance between the plane of pivot pins 63 and the free ends of sweeps 60 is greater than the distance between the plane of pivot pins 63 and the bottom 21 of trough 20. Thus, the sweeps 60 that are positioned immediately above trough 20 will engage the bottom of the trough and assume an inclined position with respect thereto. Sweeps 60 are preferably coated with a material having a low coefficient of friction, such as Teflon, to minimize wear between the sweeps and the trough.

Means is provided for selectively disabling each of the sets of sweep members by moving the same to an elevated inactive position wherein the sweep members are spaced above the trough and the material thereon. Said means includes an arm 70 secured to each sweep member 60, and extending upwardly therefrom into position for engagement with control means 71 for shifting a set of sweep members between a freely suspended active position, and the elevated inactive position. Arms 70 are generally U-shaped in cross section (FIGS. 1 and 3) and include a central portion 72, upright portions 73 extending generally perpendicularly with respect to central portion 72 at opposite edges thereof, and flange portions 74 extending outwardly from the outer edges of side portions 73 and secured at their lower ends to the upper ends of sweep members 60, as by welding or the like.

The upper end of the central portion 72 of each arm 70 includes an upwardly opening slot 75, and control means 71 includes a longitudinally extending, generally horizontally disposed control rod 76 that extends through the aligned slots 75 of each of the arms 70. A plurality of longitudinally spaced eye bolts 77 are secured to transversely extending bail members 78, the feet 79 of which are secured to brackets 15 by bolts 18, and control rod 76 impales the eyes of eye bolts 77 so as to be supported and guided thereby. Nuts 80 are threaded upon the upwardly extending externally threaded shank portions of eye bolts 77, so that the eye bolts and the control rod 76 may be vertically adjusted to a desired position.

A plurality of abutments, one for each sweep member, are provided on control rod 76, and in the illustrated embodiment, the abutments are defined by collars 81 which are slidably mounted upon control rod 76. Set screws 82 threadably engage internally threaded openings in the upper portions of collars 81, so that the collars may be fixed at preselected positions upon the control rod 76.

Control rod 76 is movable from a neutral position wherein each collars 81 is spaced from the arm 70 of the sweep member 60 associated therewith, so that all of the sweep members are disposed in the freely suspended active position, to a first sweep disabling position wherein one set of collars 81 abut against the portions 72 of the arms 70 of the set of sweep members 60 to one side of the material supply source 25 to pivot the sweep members of this set to the elevated inactive position while the sweep members of the other set remain in the active position, and to a second sweep disabling position wherein the set of collars 81 on the opposite side of the material supply source engage the arm portions 72 of the other set of sweep members 60 to pivot the sweep members of the latter set to inactive position while the sweep members of the former set remain in the active position. A suitable means for selectively positioning the control rod 76 in the above mentioned positions is illustrated in FIG. 4, and includes a pair of spaced stop members 84 fixed upon a support S that may be carried in any suitable fashion by the animal feeder frame. Stops 84 have an upwardly opening slot 85 in the upper end thereof, so that the control rod 76 may be lifted vertically relative to the support S, it being understood that the control rod 76 has sufficient flexibility to allow the same to be lifted at one end. A collar 81a is fixed upon control rod 76 adjacent the stop members 84, and cooperates therewith to locate the control rod in the sweep disabling positions. When the collar 81a is positioned in the broken line location A generally centrally between the stop members 84, the collars 81 on each side of the material supply station are spaced from the arms 70, so that the sweeps are disposed in the active position, such as that shown at the left hand side of FIG. 2. When the control rod 76 is lifted and shifted longitudinally to position the collar 81a in location B bearing against the left hand stop 84 in FIG. 4, the collars 81 on the right hand side of control rod 76 move into engagement with the arms 70, to pivot the sweep members 60 to the elevated inactive position (as shown at the right hand side of FIG. 2) wherein the lower end of the sweep member is spaced above the bottom 21 of the trough 20. With the collar 81a in position B, the collars 81 in the left hand side of the material supply station 25 are spaced from the sweep arms 70, so that the sweeps 60 to the left of the material supply station remain in the freely suspended active position. In a like manner, when the control rod 76 is lifted and the same is shifted to the right to position the collar 81a in location C, the collars 81 on the left hand side of the material supply station move into engagement with the sweep arms 70 to move the sweeps to the left of the material supply station to the elevated inactive position, while the sweeps to the right of the material supply station remain in the active position.

When the control rod is in the neutral position shown at

A in FIG. 4, the animal feeder functions in the manner described in detail in the Ferris et al. application to discharge feed from opposite ends of the trough 20, as the trough reciprocates back and forth below the material supply hopper 25. As can be best seen in FIGS. 5–7, when the right hand set of sweeps 60 is disabled, no material is dispensed from the right hand end of trough 20, and the entire amount of material on the trough is dispensed from the left hand end thereof by the sweeps to the left of the material supply station. It will be appreciated that if the sweeps 60 to the left of the material supply station were disabled, no dispensing would take place from the left hand end of the trough 20, and all dispensing would be from the right hand end thereof.

The improvement of the present invention has particular utility in a feed barn arrangement, such as that shown in FIG. 8, wherein the feed distributing device 10 is positioned above the floor 11 of the feed barn substantially on the longitudinal median plane between spaced feeding mangers 12a 12c and 12b, 12d that extend continuously in front of stalls 13. It will be appreciated that the device can be operated to distribute to each of the four mangers individually, different quantities, and also different rations (formulations) should it be desired. For example, the sweeps over 12c and 12d could be held ineffective while 12b received one ration, and subsequently, 12a received another ration in a different amount and likewise, 12a and 12b could be held ineffective while a similar procedure was repeated for 12c and 12d.

I claim:

1. In a shuttle type feeder including a frame; a material supply station associated with said frame; a row of sweep members pivotally suspended from the frame, there being a first set of said members to one side to the supply station and a second set to the other side thereof; a trough supported on said frame and adapted to receive material from the supply station, said trough having a length approximately one-half the combined effective length of the first and second sets of sweep members and being adapted to discharge material at opposite ends thereof; means for preventing effective pivotal movement of said sweep members toward said supply source; and drive means for reciprocating said trough between a first position beneath the first set of sweep members and a second position beneath the second set of sweep members as it receives material from the supply station, whereby on each reciprocation of the trough with both sets of sweeps in a freely hung active position the sweeps in the set toward which the trough is moving are pivoted by the material in the trough, while the sweeps in the other set are prevented from effective pivotal movement to push material off the training end of the trough; means for selectively deactivating one of said sets of sweep members comprising, control means movable into and out of sweep disabling positions, and means responsive to movement of said control means into a sweep disabling position for pivoting a set of sweep members to an inactive position.

2. A shuttle type feeder as defined in claim 1 wherein a plurality of spaced abutments are associated with said control means, there being one abutment for each sweep member and each of said abutments being spaced vertically from the pivotal connection to the frame of its respective sweep member, said abutments being spaced along said control means in a manner such that movement of said control means into a sweep disabling position moves the abutments associated with a set of sweep members into engagement with their respective sweep members to pivot the same to an elevated inactive position wherein the sweep members of the set do not engage the trough or the material thereon.

3. A shuttle type feeder as defined in claim 2 wherein said control means is a single control rod mounted for longitudinal movement relative to said frame, said control rod having a first portion extending to one side of said material supply station and a second portion extending to the other side of said material supply station, said control rod being movable between a neutral position wherein the abutments thereon are spaced from their respective sweep members so that both sets of sweep members are freely suspended and in active position, a first disabling position wherein the abutments on the first portion of said control rod move into engagement with the sweep members of said first set to pivot the same to inactive position while the abutments on the second portion of said control rod remain spaced from the sweep members of said second set so that the sweep members of said second set remain in active position, and a second disabling position wherein the abutments on the second portion of said control rod move into engagement with the sweep members of said second set to pivot the same to inactive position while the abutments on the first portion of said control rod remain spaced from the sweep members of said first set so that the sweep members of said first set remain in active position.

4. A shuttle type feeder as set forth in claim 3 wherein each of said abutments is defined by a collar slidably mounted on said control rod, each collar including means for locking the same at a selected position on said control rod.

5. A shuttle type feeder as set forth in claim 3 in which said sweep members are pivoted to said frame in a common horizontal plane and wherein said control rod and said abutments are disposed above said plane.

6. A shuttle type feeder as set forth in claim 5 in which each sweep member includes an arm extending generally upwardly into the path of said abutments.

UNITED STATES PATENTS 3,366,223   1/1968   Haen _____ 198—67

EDWARD A. SROKA, *Primary Examiner.*

U.S. Cl. X.R.
198—218; 119—52